United States Patent
Tsutsumi et al.

(10) Patent No.: US 7,037,126 B2
(45) Date of Patent: May 2, 2006

(54) ROTARY JOINT FOR FLUID ELECTRICITY (75) Inventors: Mikio Tsutsumi, Hyogo (JP); Hitoshi Momoda, Hyogo (JP); Yoshitaka Nakamura, Hyogo (JP)

(73) Assignee: BL Autotec, Ltd., Hyogo (JP)

( * ) Notice: Subject to any disclaimer, the term of this patent is extended or adjusted under 35 U.S.C. 154(b) by 18 days.

(21) Appl. No.: 10/470,704

(22) PCT Filed: Jan. 29, 2002

(86) PCT No.: PCT/JP02/00674

§ 371 (c)(1),
(2), (4) Date: Jul. 30, 2003

(87) PCT Pub. No.: WO02/060655

PCT Pub. Date: Aug. 8, 2002

(65) Prior Publication Data

US 2004/0114994 A1   Jun. 17, 2004

(30) Foreign Application Priority Data

Jan. 31, 2001   (JP) .......................... 2001-024314

(51) Int. Cl.
*H01R 4/60*   (2006.01)

(52) U.S. Cl. .................. 439/191; 439/17; 285/119
(58) Field of Classification Search ................ 439/17, 439/191; 285/120.1, 121.3, 121.5, 119, 136, 285/121.6; 219/86.25, 86.7; 901/42
See application file for complete search history.

(56) References Cited

U.S. PATENT DOCUMENTS

| | | | | | |
|---|---|---|---|---|---|
| 2,781,134 | A | * | 2/1957 | Weir et al. ............... | 212/285 |
| 3,351,360 | A | * | 11/1967 | Faccou .................... | 285/41 |
| 3,685,397 | A | * | 8/1972 | Gooding, Jr. ............ | 92/106 |
| 3,750,017 | A | * | 7/1973 | Bowman et al. ......... | 324/72 |
| 3,829,106 | A | * | 8/1974 | Wheelock ................ | 277/570 |
| 3,950,017 | A | * | 4/1976 | Beurer .................... | 285/124.3 |
| 4,126,183 | A | * | 11/1978 | Walker .................... | 166/338 |
| 4,378,959 | A | * | 4/1983 | Susnjara .................. | 414/732 |
| 4,438,309 | A | * | 3/1984 | Zimmer ................... | 219/86.7 |
| 5,296,671 | A | | 3/1994 | Torii et al. | |
| 5,470,236 | A | * | 11/1995 | Wissler ................... | 439/12 |
| 5,797,413 | A | * | 8/1998 | Pollack ................... | 137/1 |
| 5,908,060 | A | * | 6/1999 | Fargeot ................... | 144/4.1 |
| 6,431,553 | B1 | * | 8/2002 | Amaral et al. .......... | 277/580 |

FOREIGN PATENT DOCUMENTS

| | | |
|---|---|---|
| JP | S59-12455 | 4/1984 |
| JP | H03-126583 | 12/1991 |
| JP | 04-140511 | 5/1992 |
| JP | 05-138580 | 6/1993 |
| JP | 06-155367 | 6/1994 |
| JP | 07-096490 | 4/1995 |
| JP | 09-103931 | 4/1997 |
| JP | 09-151947 | 6/1997 |
| JP | 10-223346 | 8/1998 |
| JP | 2000-074224 | 3/2000 |
| WO | WO 99/03132 A1 | 1/1999 |

* cited by examiner

*Primary Examiner*—Neil Abrams
(74) *Attorney, Agent, or Firm*—Nixon Peabody LLP; Donald R. Studebaker (57) ABSTRACT

The present invention is directed to a rotary joint that includes a power slip ring and an electric signal slip ring, both for passing electricity between a stator and a rotor The system includes a plurality of slip rings (21,31) and a plurality of circumferentially extending fluid flow annular passages (12, 13, 14) formed in axially aligned relaation between the stator and the rotor. Water passages are constituted by some of the annual passages (12,13) and one of the annular passages (14), typically the lowest one, is used an air passage for air under pressure or an air-filled drain so that water leakage can be absorbed into the air passage or drain and does not penetrate into the region of the slip rings. The slip ring (21) with collector rings (22) is used for power and slip rings (31) are used for signals. Water passages are constituted by the annular passages, other than one of the annular passages located towards the power slip ring and the electric signal slip ring.

10 Claims, 11 Drawing Sheets

ROTARY JOINT FOR FLUID ELECTRICITY

TECHNICAL FIELD

This invention relates to a rotary joint disposed, for example, at the distal end of a robot arm, and particularly relates to a technical field regarding a sealing structure for stably passing electricity and/or fluid between a stator and a rotor.

BACKGROUND ART

Conventional rotary joints of this kind have a stator fixedly mounted to, for example, the distal end of a robot arm, and a rotor fixedly mounted to a hand side of the robot and rotatably coupled and supported to the stator, and are configured to allow communication of fluid, such as air, cooling water or welding gas, and electricity such as power electricity or electric signals between the stator and rotor so that communication of such fluid and electricity can be established even when the hand side of the robot rotates with respect to the stationary side thereof.

Furthermore, for fluid communication, the above rotary joints employ a swivel joint in which plural kinds of fluid passages are arranged between the slide surfaces of the stator and rotor. For power electricity communication, the above rotary joints employ a power slip ring consisting of a collector ring mounted to one of the stator and rotor and a slide contact mounted to the other for coming into sliding contact with the collector ring to feed electricity.

There are also known electric signal slip rings for passing electric signals between a stator and a rotor. Proposed as an example of such electric signal slip rings is, as disclosed in Japanese Unexamined Patent Publication No. 10-223346, an electric signal slip ring which includes a stationary side electrode of ring plate shape disposed on the stator side, a rotating side electrode of ring plate shape disposed on the rotor side, and a rolling element disposed between both the electrodes, and which is configured to roll the rolling element on both the electrodes by relative rotation of the rotor to the stator to pass electric signals between both the electrodes.

As described above, the rotary joint is provided with a slip ring for transmitting electric power or electric signals between the stator and rotor relatively rotating to each other. When water from the swivel joint or dust from the outside of the rotary joint sticks to the slip ring, however, leakage of electric power or failure in electric signal may occur to cause maloperation of the robot, abnormal wear of the sliding parts and so on. It is therefore desirable to institute some measures against these problems.

The present invention has been made in view of the foregoing points, and therefore its main object is to avoid penetration of water droplets or the like into the surroundings of the slip ring in the rotary joint as described above, thereby preventing the occurrence of electric leakage and so on in the power slip ring.

DISCLOSURE OF INVENTION

To attain the above object, the present invention is directed to a rotary joint including a stator, a rotor rotatably coupled and supported to the stator, an electric slip ring that has electrodes mounted to the stator and the rotor, respectively, and passes electricity between both the electrodes, and a swivel joint for communicating fluid between the stator and the rotor, and may be characterised in that the swivel joint has a single or group of annular passages formed in axially aligned relation between the stator and rotor and extending circumferentially, and an annular space filled with air is disposed between the single or group of annular passages and the electric slip ring.

In this case, the annular space may constitute an annular passage that provides an air passage of the swivel joint.

With these structures, the annular space is disposed between the annular passage of the swivel joint and the electric slip ring. Therefore, even if fluid flowing through the annular passage leaks out thereof towards the electric slip ring, the leakage fluid will reach the annular space before reaching the electric slip ring, and the fluid can be restrained by air pressure in the annular space from penetrating the annular space. As a result, it can be prevented that the leakage fluid penetrates the electric slip ring.

Furthermore, in the above inventive rotary joint, an annular space filled with air may be disposed to the opposite side of the annular passage from the electric slip ring. Thus, it can be prevented that the fluid flowing through the annular passage flows out of the rotary joint.

Alternatively, the present invention is directed to a rotary joint including a stator, a rotor rotatably coupled and supported to the stator, and a swivel joint for communicating fluid between the stator and the rotor, and may be characterised in that the swivel joint has a plurality of annular passages formed in axially aligned relation between the stator and the rotor and extending circumferentially, ring-shaped sealing members are respectively provided to both sides of each of the annular passages for sealing said each annular passage by bringing sealing surfaces of the sealing members into sliding contact with the stator or the rotor, and the sealing surface of each of the sealing members is formed with a sealing groove winding in the circumferential direction of the stator and filled with a lubricant.

Conventionally used as a sealing member is an X-ring of substantially X-shaped cross-section whose sealing surface is formed with a slit. The X-ring is disposed along a fluid passage and, for example, to the stator, and the slit in the sealing surface of the X-ring is filled with a lubricant such as grease, thereby providing a seal for the fluid passage. In this case, however, both ends of the X-ring sealing surface located on both sides of the slit come into continuous sliding contact with the stator or the rotor so that the lubricant does not reach the ends on both sides of the slit, which may promote wear of the ends on both sides of the slit.

In contrast, according the inventive structure, the sealing groove winding in the circumferential direction of the ring allows the lubricant to spread over all portions of the sealing surface located on both sides of the winding slit forming the sealing groove, thereby suppressing wear of the surface ends on both sides of the slit. This provides a further reliable seal to prevent failures or the like due to leakage of fluid from the fluid passage.

Alternatively, the present invention is directed to a rotary joint including a stator and a rotor rotatably coupled and supported to the stator, and may be characterised in that portions of the stator and the rotor which are located between their outer peripheries and form boundary surfaces are formed with a boundary groove, one of the side surfaces of the boundary groove is an inclined surface, and a ring-shaped sealing member is fitted into the boundary groove to come into contact with the inclined surface.

With the above structure, one of the side surfaces of the boundary groove is inclined, and a ring-shaped sealing member is fitted into the boundary groove to always come} into contact with the inclined side surface. Thus, even if the use environment of the rotary joint is not clean but such an environment that dust or sprayed water exists, it can be prevented with a simple structure that dust or sprayed water penetrates the inside of the rotary joint through the boundaries between the stator and the rotor. Thereby, failures or accidents can be prevented.

BEST MODE FOR CARRYING OUT THE INVENTION

A best mode for carrying out the present invention will be described as an embodiment with reference to the drawings.

Figure 10:
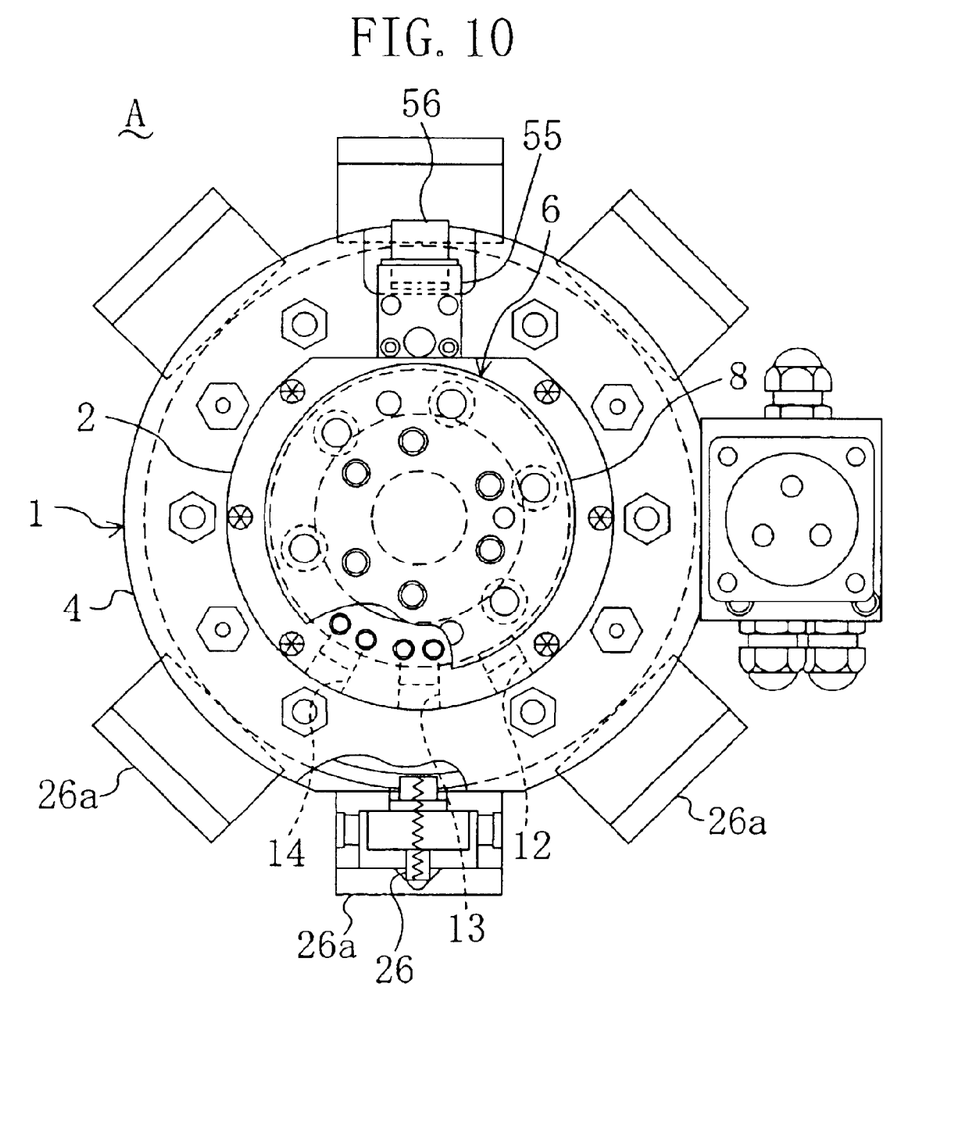
FIG. 10 is a top view of the rotary joint.
Figure 11:
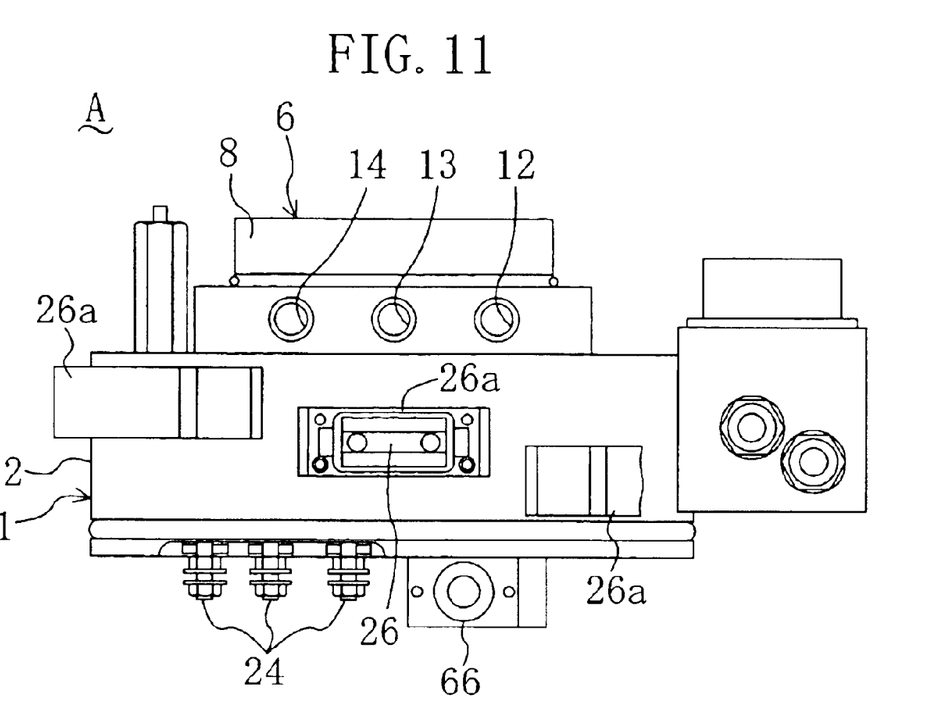
FIG. 11 is a front view of the rotary joint.
Figure 12:
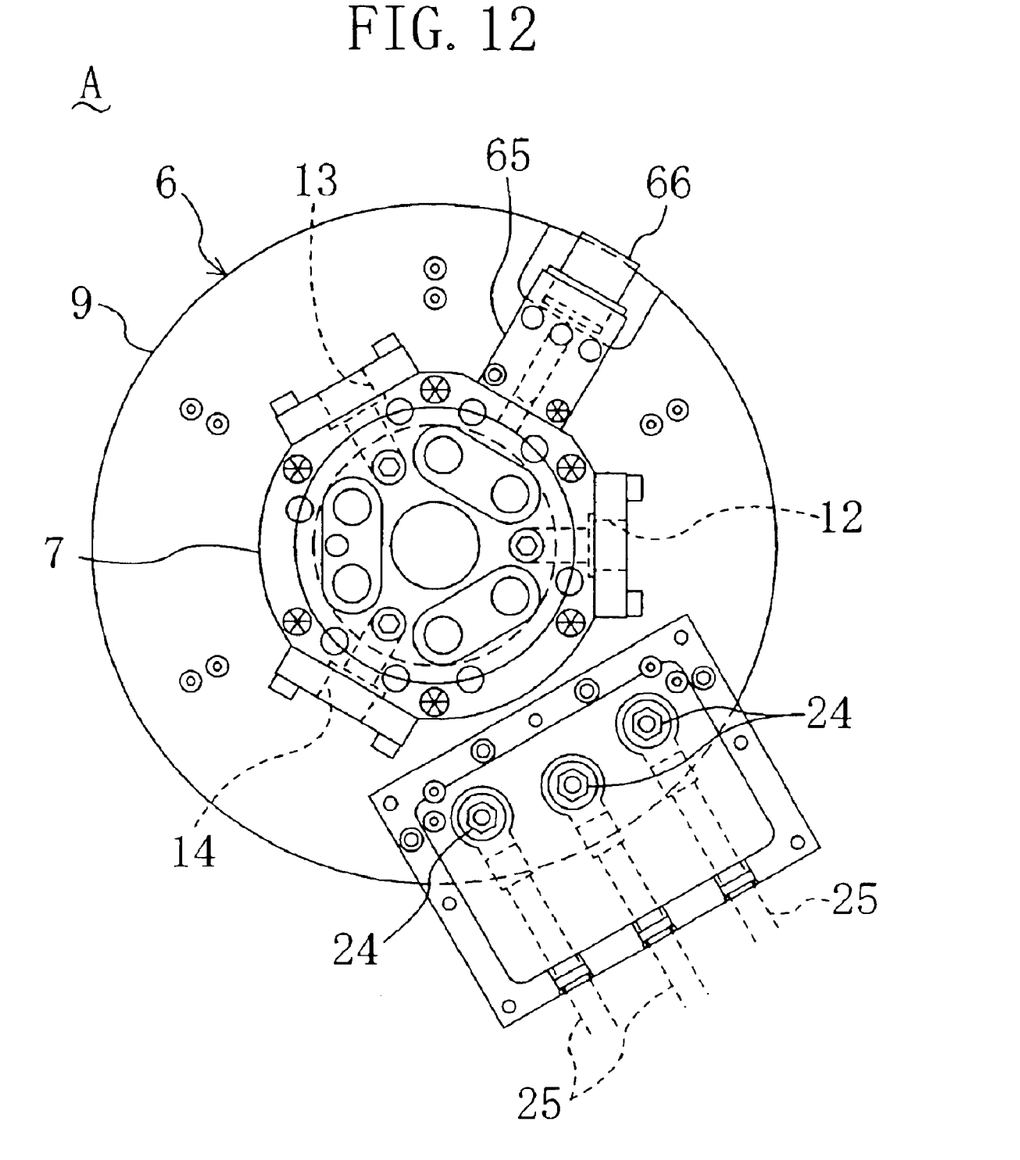
FIG. 12 is a bottom view of the rotary joint.

FIGS. 10 to 12 show a rotary joint A according to an embodiment of the present invention. This rotary joint A is arranged so as to be fitted to the distal end of an arm of an unshown welding robot for carrying out spot welding.

The rotary joint A includes a stator 1 of substantially cylindrical shape mounted to an arm side of the welding robot, and a rotor 6 of substantially cylindrical shape mounted to a welding gun side (a hand side) thereof. The rotor 6 is coupled and supported for rotation with 360 degrees or more to the stator 1.

Figure 1:
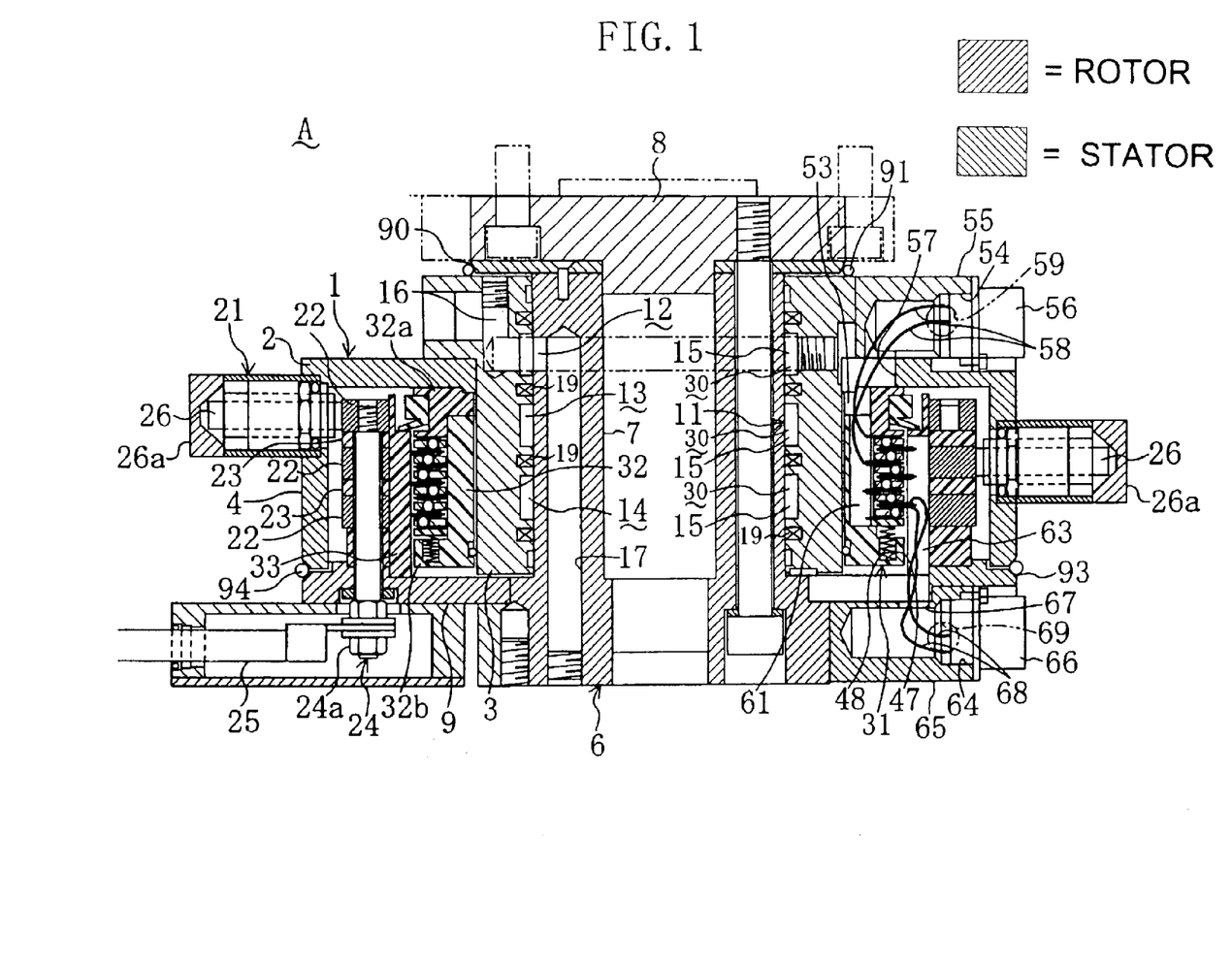
FIG. 1 is an enlarged cross-sectional view of a rotary joint according to an embodiment of the present invention.

As shown in enlarged manner in FIG. 1, the stator 1 has a cylindrical boss 3 formed integrally with an outward flange 2 at the top end (the upper end in FIG. 1), and a bottomed, cylindrical cover 4 that is disposed concentrically to surround the boss 3, is secured integrally to the boss 3 and downwardly opens.

The rotor 6 includes a cylindrical shaft 7 fitted relatively rotatably into the boss 3 of the stator 1, an upper flange 8 secured integrally on the upper end of the shaft 7 to close the opening of the cylindrical shaft 7 and located in a portion of the rotor 6 above the outward flange 2, and a lower flange 9 secured integrally about the lower end of the shaft 7 and extending radially outwardly beyond the bottom end of the boss 3 to close the lower opening of the cover 4.

Between the boss 3 of the stator 1 and the shaft 7 of the rotor 6, a swivel joint 11 is provided for communicating water and air as fluids between the stator 1 and the rotor 6. Furthermore, in a cylindrical space surrounded by the boss 3 and cover 4 of the stator 1 and the lower flange 9 of the rotor 6, a power slip ring 21 for supplying welding power from the stator 1 to the rotor 6, and an electric signal slip ring 31 located internally of the power slip ring 21 for passing different electric signals of plural kinds (six kinds in the example shown in the figures) between the stator 1 and the rotor 6 are fitted concentrically.

Figure 5:
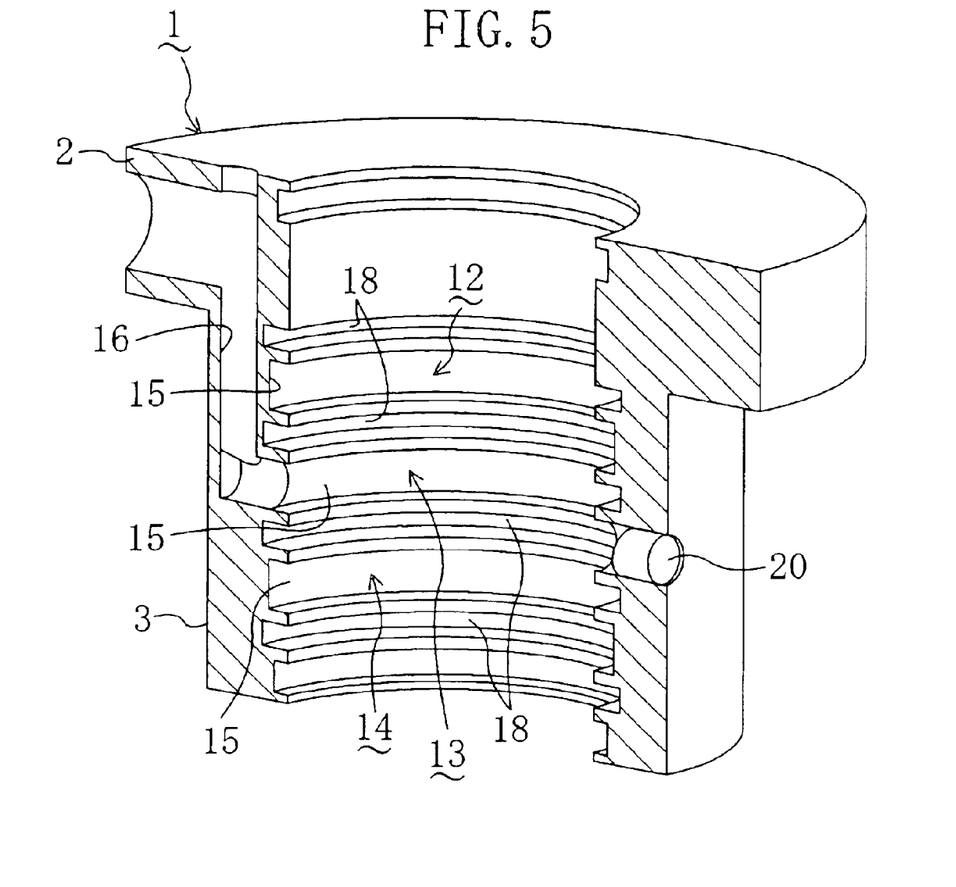
FIG. 5 is a partly-broken, perspective view showing portions of a boss of a stator which form water passages and an air passage, respectively.

The swivel joint 11 has two water passages 12, 13 and one air passage 14, and these three passages 12 to 14 have the same structure. Specifically, as also shown in FIG. 5, the internal periphery of the boss 3 of the stator 1 is formed with three annular grooves 15, 15, . . . vertically (axially) spaced from each other. These three annular grooves 15, 15, . . . are closed by the outer periphery of the shaft of the rotor so that between the stator 1 and the rotor 6, a plurality of circumferentially extending annular passages 30, 30, . . . are formed in axially aligned relation for communicating fluid between the stator 1 and the rotor 6. Furthermore, inside of the wall of the boss 3, three vertical holes 16, 16, . . . (only part of them shown) extending vertically are formed through the wall and circumferentially close to each other. The lower end of each vertical hole 16 opens into the bottom surface of the corresponding annular groove 15, while its upper end opens into the outer periphery of the outward flange 2.

On the other hand, inside of the wall of the shaft 7 of the rotor 6, three vertical holes 17, 17, . . . (only part of them shown) extending vertically are formed through the wall at circumferentially equally spaced positions. The upper end of each vertical hole 17 opens into the outer periphery of the shaft 7 to communicate with the corresponding annular groove 15 in the boss 3 of the stator 1, while the lower end of each vertical hole 17 opens into the outer periphery of the shaft 7 below the lower flange 9.

Furthermore, as a feature of the present invention, an annular space filled with air is disposed between a group of the annular passages and the electric slip rings, and the annular space constitutes an annular passage serving as an air passage of the swivel joint 11.

Specifically, the upper two 30 and 30 of the three annular passages 30, 30, . . . thus formed constitute the water passages 12 and 13, respectively, and the lower one passage 30 constitutes the air passage 14. Through these water passages 12 and 13 and air passage 14, water and air can be communicated even between the stator 1 and the rotor 6 both relatively rotated.

Figure 8:
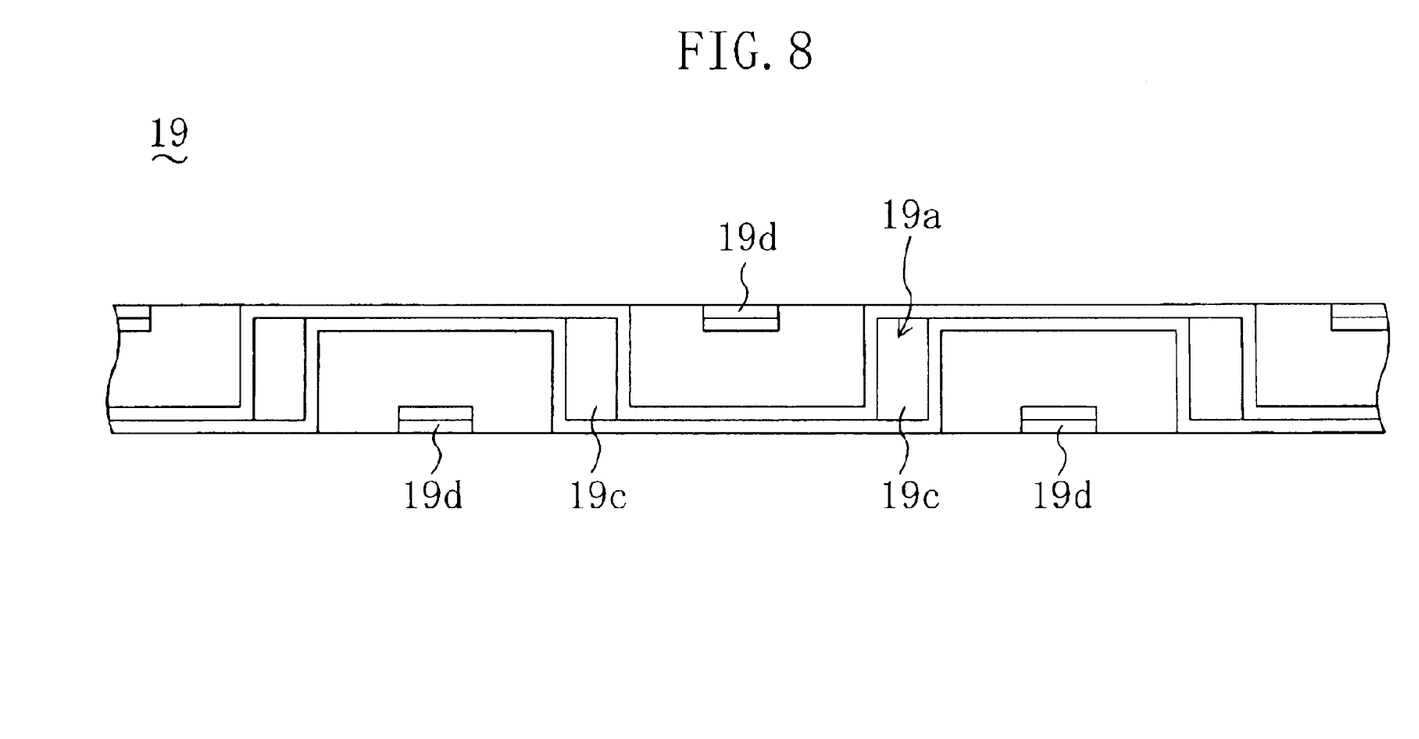
FIG. 8 is an illustration showing a sliding surface of a sealing ring in developed manner.
Figure 9:
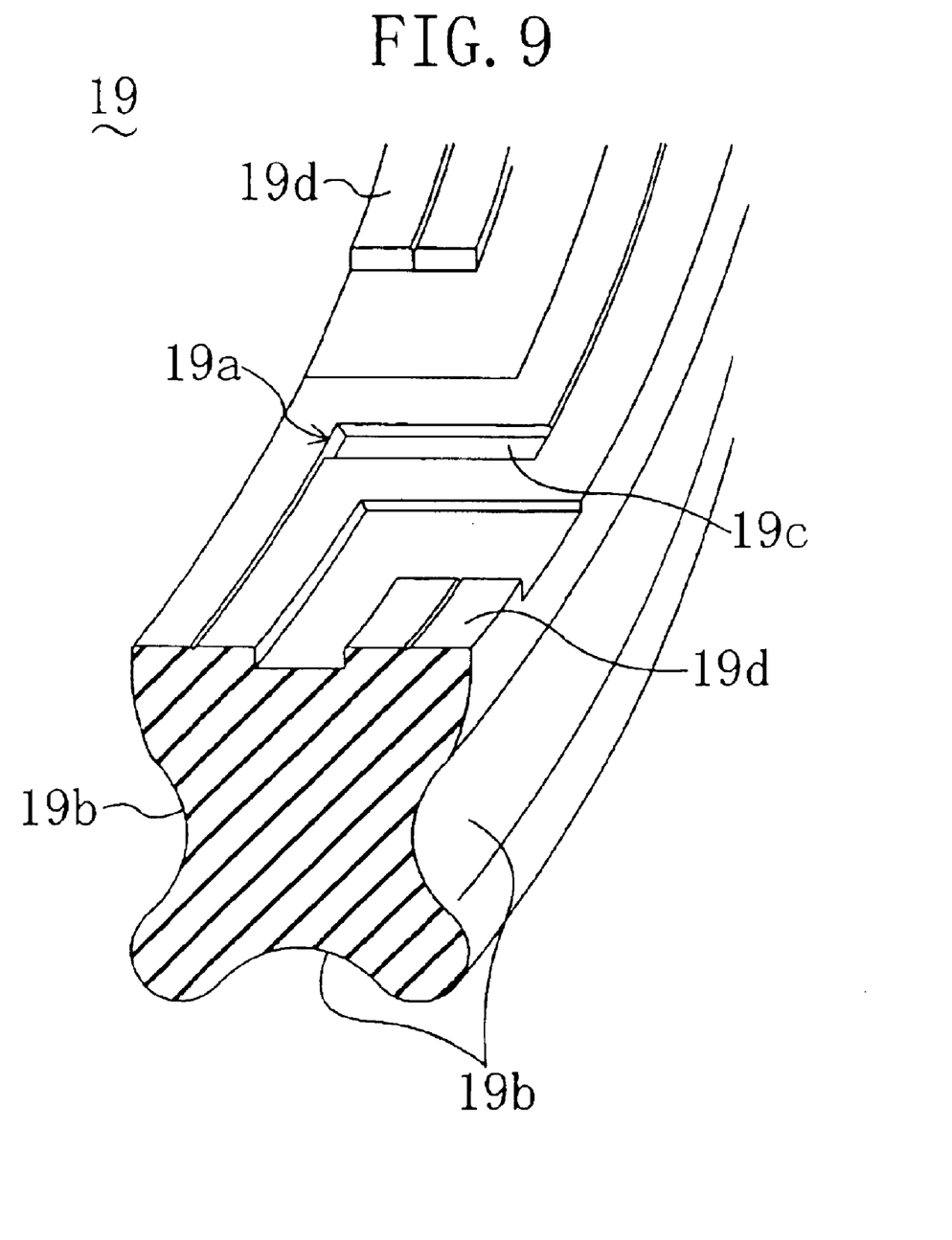
FIG. 9 is a partly cross-sectional perspective view showing the sealing ring.

Furthermore, as another feature of the present invention, as shown in FIGS. 8 and 9, the inner periphery of the boss 3 of the stator 1 is formed with four sealing grooves 18, 18, . . . one on each vertical (axial) side of the three annular grooves 15, 15, . . . , and each sealing groove 18 is fitted with a rubber-made sealing ring 19 as a ring-like sealing member for sealing each of the annular passages 30, 30, . . . , so that the inner periphery of the sealing ring 19 makes sliding contact with the outer periphery of the shaft 7 of the rotor 6 to form a seal therewith. In this sealing ring 19, as also shown in FIG. 9, its bottom and both side faces are formed with grooves 19b, 19b, . . . , respectively, while its top face as a sealing surface is formed with a slit-like sealing groove 19a winding in the circumferential direction of the stator 1. The sealing groove 19a is filled with grease as a lubricant. Also, the sealing groove 19a includes lubricant reservoirs 19c formed by expanding its width at circumferentially regular intervals (in the circumferential direction of the stator 1). As also shown in FIG. 8, between the adjacent lubricant reservoirs 19c, 19c, . . . , ridge-shaped sliding parts 19d, 19d, . . . are provided individually.

The power slip ring 21 is provided with three collector rings 22, 22, . . . concentrically arranged in the cylindrical space formed among the boss 3 and the cover 4 of the stator 1 and the lower flange 9 of the rotor 6. The collector rings 22, 22, . . . are vertically stacked through individual insulating rings 23, 23, . . . . Each collector ring 22 is screwed on the distal end (upper end) of a collector bolt 24 that passes through the other collector rings 22 in electrically insulated manner. Each collector bolt 24 passes through the lower flange 9 of the rotor 6 in electrically insulated manner. Its head 24a at the lower end protrudes below the lower flange 9, and is connected with an end of a power cable 25 that conducts electricity to the welding gun (not shown).

Three slide contacts 26, 26, . . . pass through the sidewall of the cover 4 of the stator 1 at circumferentially equally spaced and mutually neighbouring positions in electrically insulated manner, and are secured to the sidewall of the cover 4 with each covered with a cover 26a. The inner end of each slide contact 26 is pushed slidably against the outer periphery of the corresponding collector ring 22 with a predetermined pressing force. The sliding contact between each slide contact 26 and the corresponding collector ring 22 allows welding power at a large current to be transmitted even between the stator 1 and the rotor 6 both relatively rotated.

Furthermore, the electric signal slip ring 31 is provided with a cylindrical inner housing 32 fitted onto the outer periphery of the boss 3 of the stator 1, and a cylindrical outer housing 33 fitted concentrically onto the inner housing 32 with an annular space 34 created therebetween as described later. Both the housings 32 and 33 are made of resin, for example. The outer periphery of the inner housing 32 is formed at the upper and lower ends integrally with outward flanges 32a and 32b, respectively. The annular space 34 of cylindrical shape is defined so as to be surrounded by both the flanges 32a and 32b, a vertical intermediate portion of the outer periphery of the inner housing 32, and the outer housing 33.

The annular space 34 between the inner and outer housing 32 and 33 accommodates six ring-plate-shaped stationary side electrodes 36a to 36f and six ring-plate-shaped rotating side electrodes 40a to 40f. Each of these electrodes 36a to 36f and 40a to 40f is made of phosphor bronze, for example, and its surface is silver-plated. As shown in detail and enlarged manner in FIGS. 2 and 3, the six stationary side electrodes 36a to 36f are arranged concentrically with the axis of the stator 1 and aligned axially or vertically with each other, while the six rotating side electrodes 40a to 40f are likewise arranged concentrically with the axis of the rotor 6 and aligned axially or vertically with each other.

Figure 6:
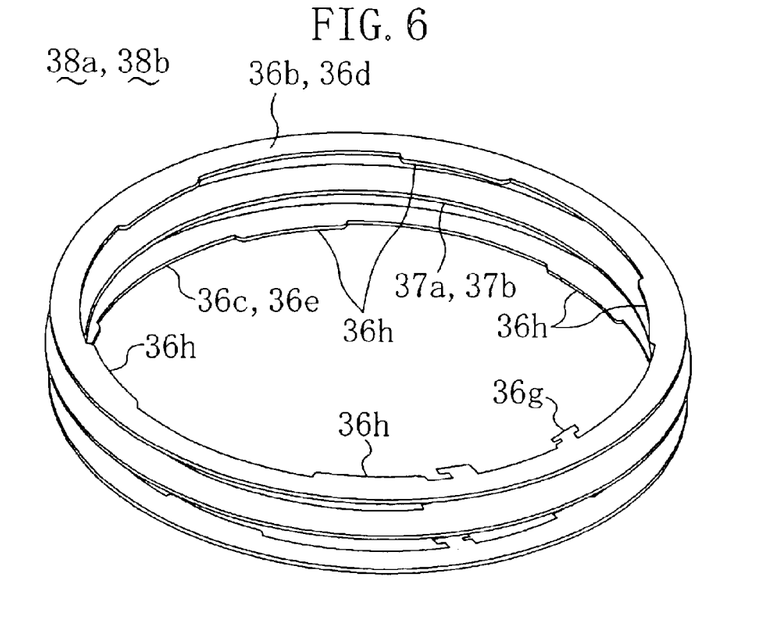
FIG. 6 is a perspective view showing the structure of a stationary electrode stack.

Among the six stationary side electrodes 36a to 36f, two electrodes 36a and 36f located at the upper and lower ends (axial ends) are end electrodes. For the four stationary side electrodes 36b to 36e exclusive of the two stationary side electrodes 36a and 36f as end electrodes, as also shown in FIG. 6, the one pair of axially adjacent stationary side electrodes 36b and 36c are stacked with a ring-shaped stationary side insulating seat 37a interposed therebetween, and the other pair of axially adjacent stationary side electrodes 36d and 36e are stacked with a ring-shaped stationary side insulating seat 37b interposed therebetween. The one pair of electrodes 36b and 36c and the other pair of electrodes 36d and 36e form two individual stationary side electrode stacks 38a and 38b with the stationary side insulating seats 37a and 37b, respectively.

Figure 7:
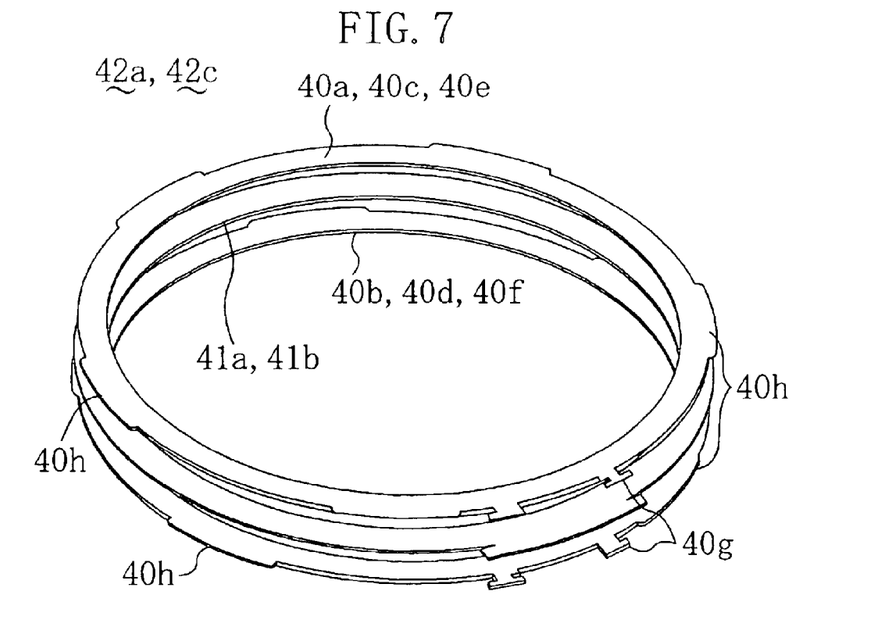
FIG. 7 is a perspective view showing the structure of a rotating electrode stack.

On the other hand, for the six rotating side electrodes 40a to 40f, as also shown in FIG. 7, the one pair of axially adjacent rotating side electrodes 40a and 40b are stacked with a ring-shaped rotating side insulating seat 41a interposed therebetween, the second pair of axially adjacent rotating side electrodes 40c and 40d are stacked with a ring-shaped rotating side insulating seat 41b interposed therebetween, and the third pair of axially adjacent rotating side electrodes 40e and 40f are stacked with a ring-shaped rotating side insulating seat 41c interposed therebetween. The one pair of electrodes 40a and 40b, the second pair of electrodes 40c and 40d, and the third pair of electrodes 40e and 40f form three individual rotating side electrode stacks 42a to 42c with the rotating side insulating seats 41a to 41c, respectively.

A group of the two stationary side electrode stacks 38a and 38b and another group of the three rotating side electrode stacks 42a to 42c are arranged between the stationary side electrodes 36a and 36f as a pair of end electrodes located at axial ends of the electric signal slip ring 31 so that one from one group and one from the other alternate axially or vertically and all in each group are axially aligned.

Figure 4:
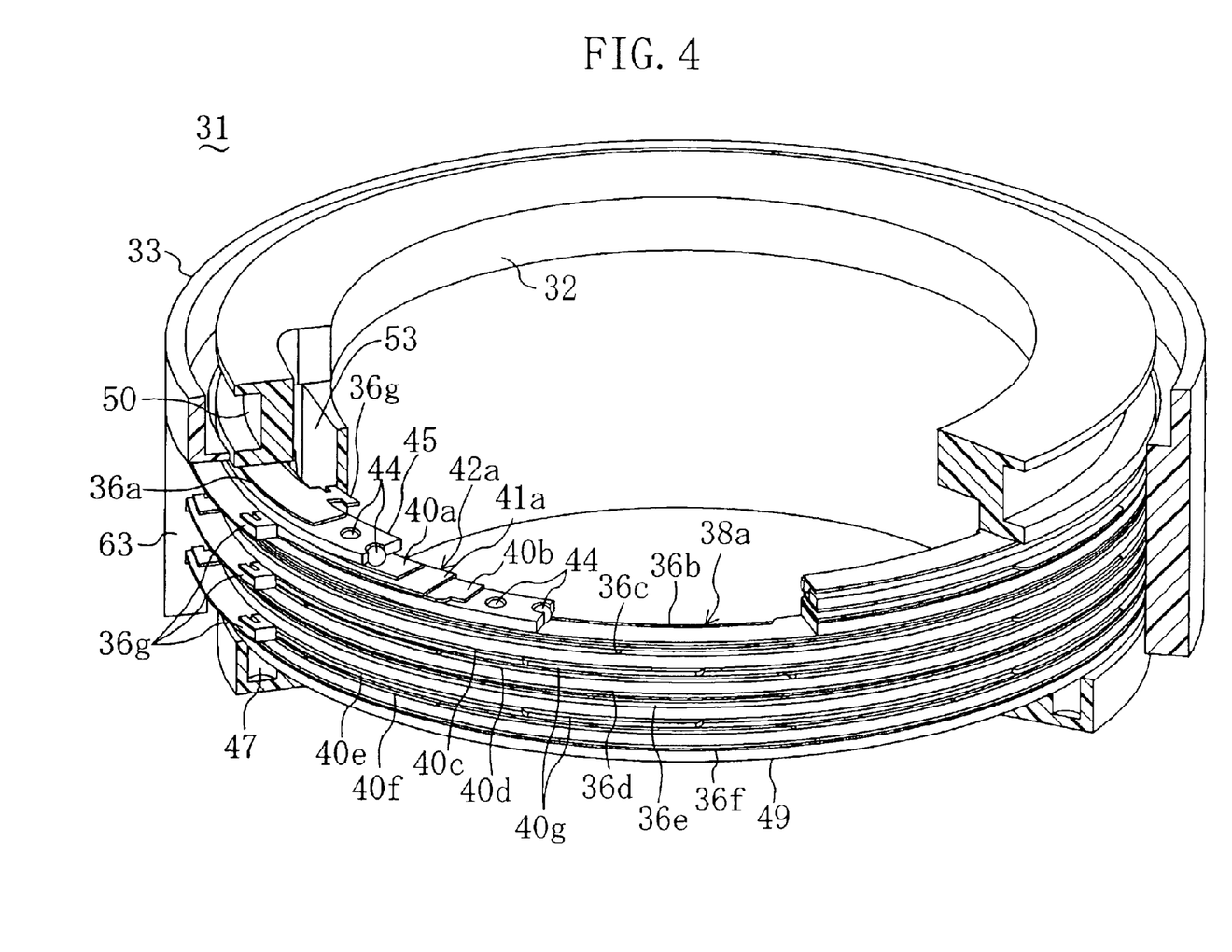
FIG. 4 is an enlarged perspective view showing the electric signal slip ring with portions broken away.

Furthermore, between each of the stationary side electrodes 36a and 36f as the end electrodes and an axially opposed one of the rotating side electrodes 40a and 40f of the rotating side electrode stacks 42a and 42c, and between each opposed two of the stationary and rotating side electrodes 36b to 36e and 40b to 40e of the axially adjacent stationary and rotating side electrode stacks 38a, 38b and 42a to 42c, rolling elements 44 of steel balls are interposed for rolling on each opposed two of these electrodes 36a to 36f and 40a to 40f through rotation of the rotor 6 relative to the stator 1 to pass electric signals between the opposed two of the electrodes 36a to 36f and 40a to 40f. As shown in FIG. 4, the plurality of steel balls 44 are disposed circumferentially at regular intervals between each opposed two of the electrodes 36a to 36f and 40a to 40f. Each of the rolling elements 44, 44, . . . is received and held in a corresponding one of retaining holes 45a in a ring-plate-shaped retainer 45 located between each opposed two of the electrodes 36a to 36f and 40a to 40f. Each rolling element 44 is formed of, for example, a steel ball obtained by quenching carbon steel, and its surface is silver-plated.

The lower flange 32b of the inner housing 32 is formed at the top surface with an annular spring groove 47, and the spring groove 47 accommodates a spring 48 as a pressing means for pressing the stationary side electrode 36f as the lower end electrode towards the stationary side electrode 36a as the upper end electrode. A ring-plate-shaped insulator 49 is interposed between the stationary side electrode 36f as the lower end electrode and the spring 48 so that the spring 48 presses the electrode 36f through the insulator 49.

The upper flange 32a of the inner housing 32 is formed at the outer periphery with an annular packing groove 50, and the packing groove 50 accommodates a rubber-made packing 51 of substantially V-shaped section having a lip 51a with the lip 51a pressing against the top surface of the outer housing 33. The packing 51 provides a seal between the upper ends of both the housings 32 and 33.

A portion of the inner housing 32 located towards the stator 1 is formed with a rectangular, bottomed hole 53 opening into the top surface of the inner housing 32. The outer periphery of the cover 4 of the stator 1 is mounted integrally with a connector fitting part 55 having a threaded hole 54, and a stationary side connector 56 is secured to the threaded hole 54 by screw-threaded engagement. The threaded hole 54 of the connector fitting part 55 is communicated with the bottomed hole 53 of the inner housing 32 via a through hole 57 formed in the cover 4. Furthermore, as also shown in FIG. 6, the inner peripheries of the stationary side electrodes 36a to 36f are provided with connection terminals 36g to extend to lie within the bottomed hole 53 of the inner housing 32, respectively. The connection terminals 36g are securely connected with one ends of stationary side electric wires 58, respectively. These six stationary side electric wires 58, 58, ... run through the bottomed hole 53, the through hole 57 of the cover 4 and the threaded hole 54 of the connector fitting part 55, and are then connected at their other ends with the stationary side connector 56.

On the other hand, a portion of the outer housing 33 located towards the rotor 6 is formed at the outer periphery with a cutaway 63 formed by cutting away part of the outer housing 33 in a rectangular shape from the bottom surface. The outer periphery of the lower flange 9 of the rotor 6 is mounted integrally with a connector fitting part 65 having a threaded hole 64, and a rotating side connector 66 is secured to the threaded hole 64 by screw-threaded engagement. The threaded hole 64 is communicated with the cutaway 63 of the outer housing 33 via a through hole 67 formed in the lower flange 9. Furthermore, as also shown in FIG. 7, the outer peripheries of the rotating side electrodes 40a to 40f are provided with connection terminals 40g to extend to lie within the cutaway 63 of the outer housing 33, respectively. The connection terminals 40g are securely connected with one ends of rotating side electric wires 68, respectively. These six rotating side electric wires 68, 68, ... run through the cutaway 63, the through hole 67 of the lower flange 9 and the threaded hole 64 of the connector fitting part 65, and are then connected at their other ends with the rotating side connector 66.

By conducting electricity between the individual stationary side electrodes 36a to 36f and the opposed individual rotating side electrodes 40a to 40f via the spherical bodies 44, six kinds of electric signals are passed even between the stator 1 and the rotor 6 both relatively rotated, as shown in Table 1.

Figure 2:
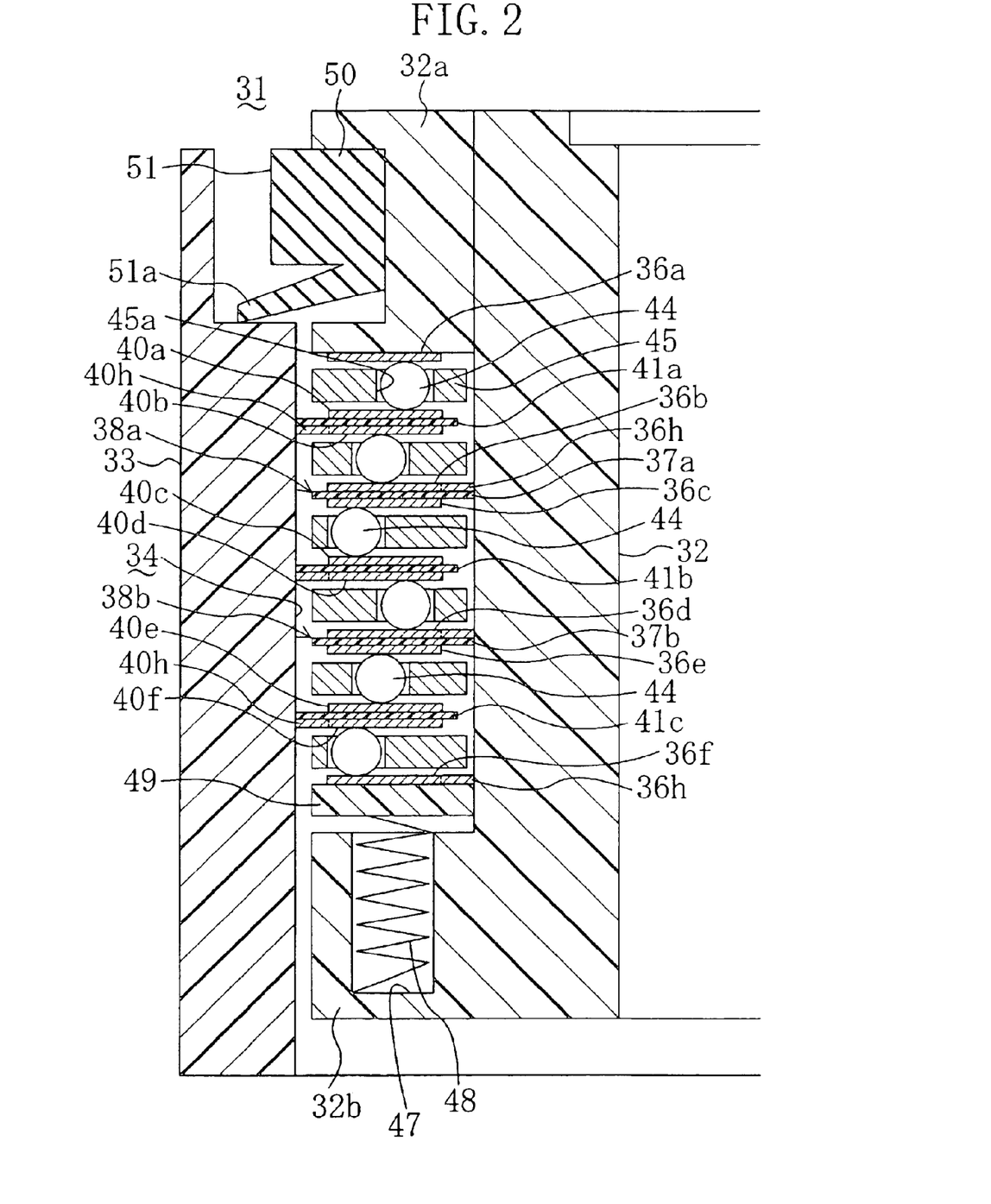
FIG. 2 is a cross-sectional view showing one side of an electric signal slip ring in enlarged manner.
Figure 3:
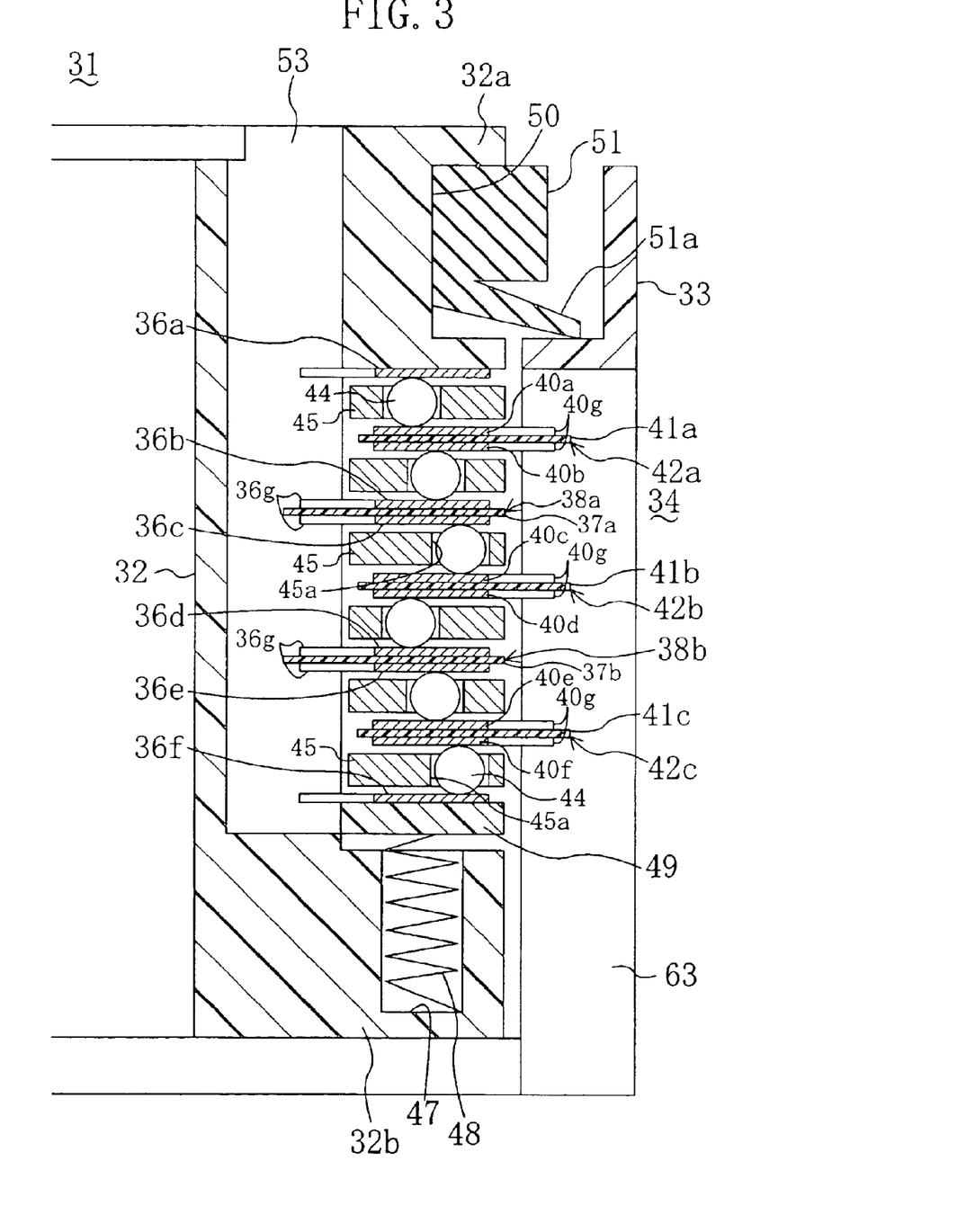
FIG. 3 is a cross-sectional view showing the other side of the electric signal slip ring in enlarged manner.

Furthermore, as shown in FIGS. 2, 3 and 6, the outer periphery of each of the stationary side electrodes 36a to 36f has a circular shape, while the inner periphery thereof is provided with a plurality of (five in the example shown) abutments 36h, 36h, ... extending inwardly at positions circumferentially equally spaced from each other. The stationary side electrodes 36a to 36f are fitted and borne against the outer periphery of the inner housing 32 with the abutments 36h, 36h, ... registering against it. A certain clearance is left between the outer peripheries of the stationary side electrodes 36a to 36f and the inner periphery of the outer housing 33.

On the other hand, as shown in FIGS. 2, 3 and 7, the inner periphery of each of the rotating side electrodes 40a to 40f has a circular shape, while the outer periphery thereof is provided with a plurality of (five in the example shown) abutments 40h, 40h, ... extending outwardly at positions spaced circumferentially equally from each other. The rotating side electrodes 40a to 40f are fitted and borne against the inner periphery of the outer housing 33 with the abutments 40h, 40h, ... registering against it. A certain clearance is left between the inner peripheries of the rotating side electrodes 40a to 40f and the outer periphery of the inner housing 32.

Furthermore, as still another feature of the present invention, portions of the stator 1 and the rotor 6 which are located between their outer peripheries and form boundary surfaces are formed with boundary grooves having a V-shaped or wedge-shaped cross-section, and O-rings are fitted into these boundary grooves, respectively.

Specifically, as shown in FIG. 1, the lower end of the outer periphery, i.e., the side surface, of the upper flange 8 of the rotor 6 is chamfered, so that a boundary groove 90 is formed to have a wedge-shaped cross-section between the end of the outer periphery of the upper flange 8 and the top surface of the boss 3 of the stator 1. A rubber-made O-ring 91 is fitted into the boundary groove 90.

Furthermore, the upper end of the outer periphery, i.e., the side surface, of the lower flange 9 of the rotor 6 and the lower end of the outer periphery, i.e., the side surface, of the cover 4 of the stator 1 are chamfered, so that a boundary

TABLE 1

| Signal | Stator side (Inner housing) | Spheric body | Rotor side (Outer housing) |
|---|---|---|---|
| 1 | Stationary side electrode 36a | | |
| | | 44 | |
| | | | Rotating side electrode 40a |
| | | | Rotating side insulating seat 41a |
| 2 | | | Rotating side electrode 40b |
| | | 44 | |
| | Stationary side electrode 36b | | |
| | Stationary side insulating seat 37a | | |
| 3 | Stationary side electrode 36c | | |
| | | 44 | |
| | | | Rotating side electrode 40c |
| | | | Rotating side insulating seat 41b |
| 4 | | | Rotating side electrode 40d |
| | | 44 | |
| | Stationary side electrode 36d | | |
| | Stationary side insulating seat 37b | | |
| 5 | Stationary side electrode 36e | | |
| | | 44 | |
| | | | Rotating side electrode 40e |
| | | | Rotating side insulating seat 41c |
| 6 | | | Rotating side electrode 40f |
| | | 44 | |
| | Stationary side electrode 36f | | | groove 93 is formed to have a V-shaped cross-section between the upper end of the outer periphery of the lower flange 9 and the lower end of the outer periphery of the cover 4. A rubber-made O-ring 94 is fitted into the boundary groove 93.

According to this embodiment, when the rotor 6 is rotating relative to the stator 1 during operation of the welding robot for welding work with the welding gun, water and air are passed between the stator 1 and the rotor 6 through the two water passages and the air passage 14. Furthermore, the slide contacts 26 on the stator 1 side comes into sliding contact with the collector rings 22 on the rotor 6 side, respectively, so that welding power at a large current is supplied from the stator 1 side to the rotor 6 side. Furthermore, six kinds of electric signals are passed between the stator 1 and the rotor 6 in relative rotation.

Furthermore, an air passage 14 is disposed between the water passages 12, 13 of the swivel joint and the power and electric signal slip rings 21, 31. Therefore, even if water flowing through the water passage 12 or 13 leaks out towards the power slip ring 21 and the electric signal ring 31, the leakage water will reach the vicinity of the air passage 14 before reaching the power slip ring 21 and the electric signal slip ring 31, and the water can be restrained by air pressure in the air passage 14 from penetrating the air passage 14 (in case that a certain amount of water penetrates the air passage 14, it can be stored in the air passage 14). Thus, it can be prevented that the leakage water penetrates the power slip ring 21 and the electric signal slip ring 31.

Conventionally used as a sealing member is an X-ring of substantially X-shaped cross-section whose sealing surface is formed with a slit. The X-ring is disposed along a fluid passage and, for example, to the stator, and the slit in the sealing surface of the X-ring is filled with a lubricant such as grease, thereby providing a seal for the fluid passage. In this case, however, both ends of the X-ring sealing surface located on both sides of the slip come into continuous sliding contact with the stator or the rotor so that the lubricant does not reach the ends on both sides of the slit, which may promote wear of the ends on both sides of the slit.

In contrast, according the inventive structure, the sealing groove 19a winding in the circumferential direction of the ring, as also shown in FIG. 8, allows the lubricant flowing out of the lubricant reservoir 19c to spread over flat portions of the sealing surface between individual adjacent lubricant reservoirs 19c and 19c (flat portions thereof on which individual sliding parts 19d are formed). Thus, the lubricant can be spread over all portions of the sealing surface located on both sides of the winding slit forming the sealing groove 19a, thereby suppressing wear of the surface ends on both sides of the slit. This provides a further reliable seal to prevent failures or the like due to leakage of water from the water passages 12 and 13.

Furthermore, since the sliding parts 19d are provided, they can bear the flat portions between the individual adjacent lubricant reservoirs 19c and 19c to prevent the sealing ring from twisting in the axial direction of the shaft 7.

For example, the use environment of the rotary joint is not clean but may be an environment in which dust or sprayed water exists. Even in such an environment, if the O-rings 91 and 94 are fitted at the boundaries between the outer peripheries of the stator 1 and the rotor 6, respectively, as in the present invention, it can be prevented with a simple structure that dust or sprayed water penetrates the inside of the rotary joint A through the boundaries between the stator 1 and the rotor 6. Thereby, failures or accidents can be prevented.

In the above embodiment, the lowest annular passage of the swivel joint 11 constitutes an air passage 14 and the upper two annular passages constitute water passages 12 and 13. Instead of the air passage 14 at the lowest position, an annular space closed and filled with air may be provided. Alternatively, instead of the air passage 14, a drain passage may be provided for draining leakage water from the water passages 12 and 13. In these manners, the same effects as obtained in the above embodiment can be obtained.

Instead of the upper water passage 12 of the swivel joint 11, an annular space closed and filled with air may be provided. Alternatively, an air passage for communicating air between the stator 1 side and the rotor 6 side may be provided instead. In these manners, in addition to the effects of the above embodiment, there can be exhibited the effect of preventing water flowing through the water passage 13 from flowing out of the rotary joint A.

The present embodiment discloses the case where three annular passages 30 are provided in the swivel joint 11. The present invention is applicable to other cases where any other plurality of annular passages 30 are provided. In these cases, it is not necessary that all of annular passages 30 located at both axial ends and an annular passage 30 located between adjacent annular spaces are water passages. Some of the annular passages may be one or ones through which another kind of fluid flows.

Furthermore, in the above embodiment, water flowing through the water passage 13 is prevented from flowing out thereof. The fluid which the present invention intends to prevent from flowing out is not limited to water. For example, the present invention is applicable to an annular passage 30 through which a gas such as chlorine gas or other fluids such as oil flow.

The rotary joint of the present invention is not limited to one which has slip rings 21 and 31. Specifically, in a rotary joint including a stator 1, a rotor 6 coupled and rotatably supported to the stator 1, and a swivel joint 11 provided between the stator 1 and the rotor 6 for communicating fluid between the stator 1 and the rotor 6, the swivel joint 11 may have a single or group of annular passages 30 formed in axially aligned relation and extending circumferentially, and annular spaces filled with air may be axially arranged with the single or group of annular passages 30 interposed therebetween.

In this case, at least one of both the annular spaces may constitute an annular passage 30 that provides an air passage of the swivel joint.

Thus, the annular space is provided between the annular passage 30 of the swivel joint 11 and the outside of the rotary joint. In this manner, even if fluid flowing through the annular passage 30 leaks out of the swivel joint, the leakage fluid reaches the annular space before reaching the outside of the rotary joint, and air pressure in the annular space can suppress penetration of the fluid into the annular space. Therefore, the fluid flowing through the annular passage 30 can be prevented from flowing out of the rotary joint.

Industrial Applicability

According to the present invention, in a rotary joint including a swivel joint for communicating fluid between a stator and a rotor, the swivel joint has a single or group of annular passages formed in axially aligned relation and extending circumferentially, and annular spaces filled with air are axially arranged with the single or group of annular passages interposed therebetween. Thus, the present invention has a high industrial applicability in that fluid flowing through the annular passage can be prevented from flowing out of the rotary joint, thereby improving the reliability of the rotary joint.

What is claimed is:

1. A rotary joint comprising:
   a stator;
   a rotor rotatably coupled to and supported by the stator;
   an electric slip ring that has electrodes mounted to the stator and the rotor and passes electricity between the electrodes, and a swivel joint for communicating fluid between the stator and the rotor, wherein the electric slip ring is concentrically arranged at a distance further than the swivel joint from the rotational axis of the rotor, such that the electric slip ring overlaps the swivel joint when viewed from a direction orthogonal to the rotational axis,
   an annular space, formed between a portion of the stator and a portion of the rotor and adjacent to the swivel joint, to accommodate the electric slip ring, wherein the center of the electric slip ring is at the rotational axis of the rotor,
   wherein the swivel joint has a single or more of annular passages formed in axially aligned relation between the stator and rotor and extending circumferentially, and through which the fluid flows, and
   an annular space filled with air flowing to and from the exterior is disposed in a position to block flow of fluid into the region of the electric slip ring between the single or group of annular passages and the annular space for the electric slip ring.

2. The rotary joint of claim 1, wherein the annular space filled with air constitutes an annular passage that provides an air passage of the swivel joint.

3. The rotary joint of claim 1, further comprising:
   an annular space filled with air is disposed to the opposite side of the annular passage from the electric slip ring.

4. The rotary joint of claim 1, further comprising
   ring-shaped sealing members that are respectively provided to both sides of each of the annular passages for sealing said each annular passage by bringing sealing surfaces of the sealing members into sliding contact with the stator or the rotor,
   the sealing surface of each of the sealing members is formed with a sealing groove winding in the circumferential direction of the sealing members and filled with a lubricant, and
   in the sealing groove, a plurality of lubricant reservoirs of which a groove width is larger than the other portions thereof are arranged circumferentially at regular intervals of the sealing members.

5. The rotary joint of claim 1, wherein
   portions of the stator and the rotor which are located between the outer peripheries thereof and form boundary surfaces are formed with a boundary groove,
   one of the side surfaces of the boundary groove is an inclined surface, and
   a ring-shaped sealing member is fitted into the boundary groove to come into contact with the inclined surface.

6. The rotary joint of claim 1, wherein the annular space filled with air constitutes a drain passage for draining leakage fluid from the annular passage of the swivel joint.

7. The rotary joint of claim 3, wherein the annular space filled with air constitutes a drain passage for draining leakage fluid from the annular passage of the swivel joint.

8. The rotary joint of claim 2, wherein
   portions of the stator and the rotor which are located between the outer peripheries thereof and form boundary surfaces are formed with a boundary groove,
   one of the side surfaces of the boundary groove is an inclined surface, and
   a ring-shaped sealing member is fitted into the boundary groove to come into contact with the inclined surface.

9. The rotary joint of claim 3, wherein
   portions of the stator and the rotor which are located between the outer peripheries thereof and form boundary surfaces are formed with a boundary groove,
   one of the side surfaces of the boundary groove is an inclined surface, and
   a ring-shaped sealing member is fitted into the boundary groove to come into contact with the inclined surface.

10. The rotary joint of claim 4, wherein
    portions of the stator and the rotor which are located between the outer peripheries thereof and form boundary surfaces are formed with a boundary groove,
    one of the side surfaces of the boundary groove is an inclined surface, and
    a ring-shaped sealing member is fitted into the boundary groove to come into contact with the inclined surface.

* * * * *

UNITED STATES PATENT AND TRADEMARK OFFICE
CERTIFICATE OF CORRECTION

| | | |
|---|---|---|
| PATENT NO. | : 7,037,126 B2 | Page 1 of 1 |
| APPLICATION NO. | : 10/470704 | |
| DATED | : May 2, 2006 | |
| INVENTOR(S) | : Tsutsumi et al. | |

It is certified that error appears in the above-identified patent and that said Letters Patent is hereby corrected as shown below:

Title page, item (54) Title: and Column 1, Should read --ROTARY JOINT FOR FLUID AND ELECTRICITY--.

Signed and Sealed this

Twenty-seventh Day of March, 2007

JON W. DUDAS
*Director of the United States Patent and Trademark Office*